Oct. 18, 1938.  F. L. DARLING  2,133,538

HYDRAULIC BRAKE HOLDING APPARATUS

Filed April 28, 1938  2 Sheets-Sheet 1

Inventor
Frank L. Darling
Albert E. Dieterich
and
By Theodore H. Rutley
Attorneys

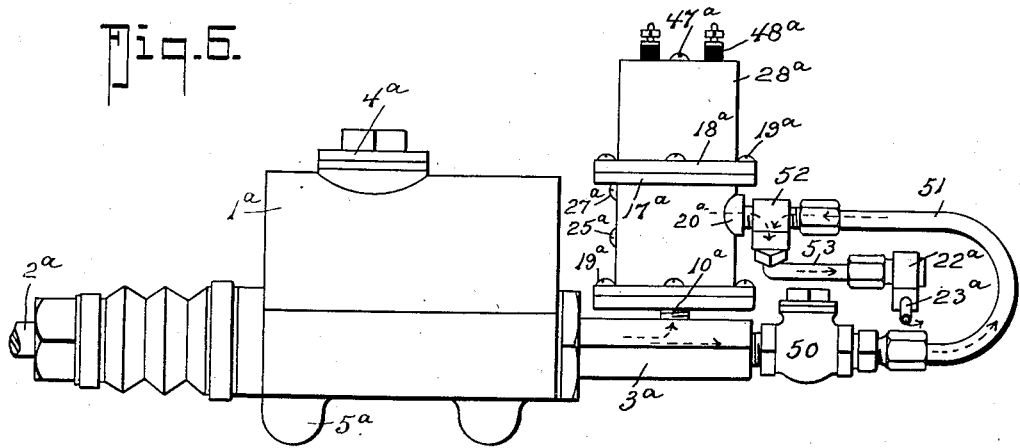
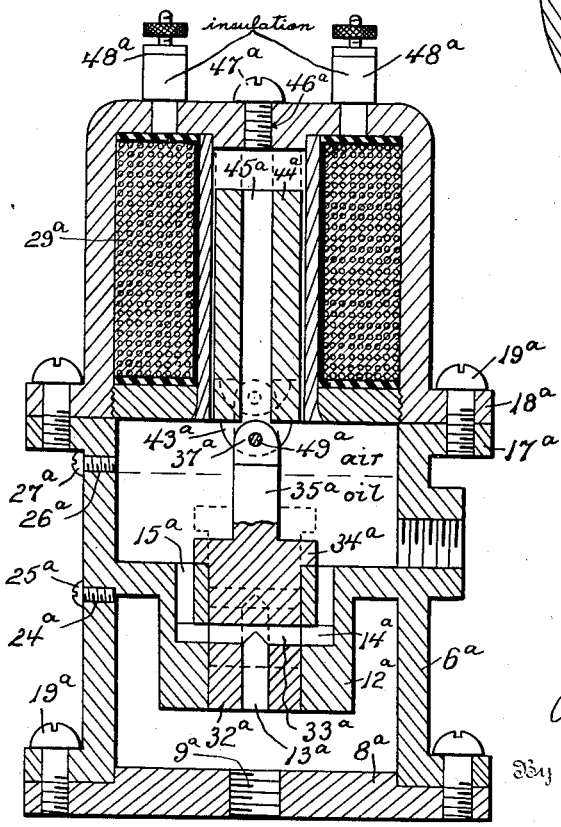

Patented Oct. 18, 1938

2,133,538

UNITED STATES PATENT OFFICE 2,133,538

HYDRAULIC BRAKE HOLDING APPARATUS

Frank L. Darling, New York, N. Y.

Application April 28, 1938, Serial No. 204,902

24 Claims. (Cl. 188—265)

My invention relates particularly to motor vehicles having hydraulic brakes.

Drivers of automobiles generally have recognized the dangers and inconveniences of having to hold one's foot on the brake pedal while the vehicle has made a temporary stop, as for a traffic light. Especially is danger present if the vehicle has stopped while on its way up a hill for then when the driver wishes to start the machine rolling forwardly he must shift his foot from the brake pedal to the accelerator pedal and during the interval of shift the car is unbraked and usually begins to roll backwardly a greater or lesser distance, depending on the time required by the operator to shift his foot over from the brake pedal to the accelerator pedal. Some drivers when making short time stops frequently use the clutch as a brake to hold the car from rolling backward, while maintaining a foot also on the accelerator pedal for a quick get-away, with consequent unnecessary wear on the clutch, resulting in expensive relining or clutch replacement repairs.

Again, in going down long hills, the driver not infrequently gets tired of holding his foot in the brake-applying position.

It is therefore an object of the invention to provide a device of a simple, inexpensive, easily-operated character, which will eliminate all the foregoing objectionable features of present-day practice.

It has also been observed that with hydraulic brakes, a sudden application of the foot power to the brake pedal often results in locking the brakes, with resultant shock to the occupants of the vehicle and sometimes causing serious injury due to the occupants of the vehicle being thrown forwardly by the sudden stop.

It is therefore a further object to combine with the brake holding feature of my invention, means to cushion the application of the brakes so as to reduce danger of locking to the minimum.

Other objects will in part be obvious and in part be pointed out hereinafter.

To the attainment of the above objects and ends the invention still further resides in those novel features of construction, combination and arrangement of parts, all of which will be first fully described in the detailed description and then be particularly pointed out in the appended claims, reference being had to the accompanying drawings, in which:—

Fig. 5 is an enlarged detail section on the line 5—5 of Fig. 3.

Fig. 6 is a view similar to Fig. 1, looking at the opposite side of the brake applying cylinder and showing another embodiment of the invention.

Fig. 7 is an enlarged, central, vertical, longitudinal section similar to Fig. 3 of the modified attachment shown in Fig. 6.

Figure 1:
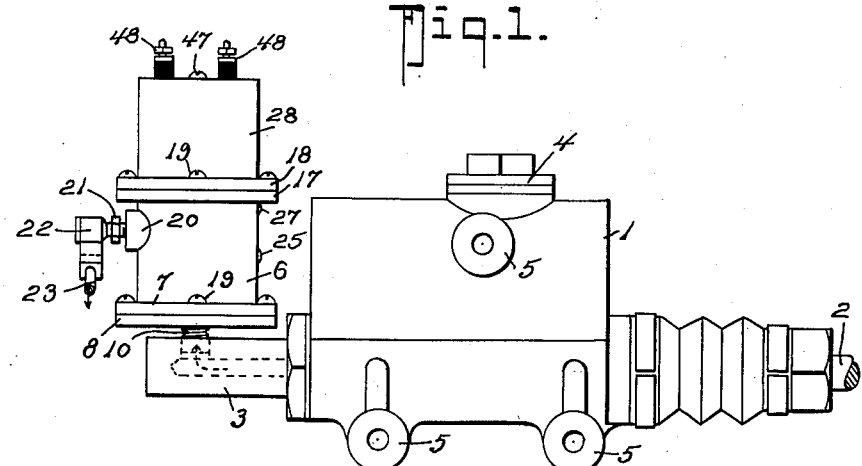
Fig. 1 is a side elevation of an hydraulic brake applying cylinder (Lockheed type) with my apparatus applied.
Figure 2:
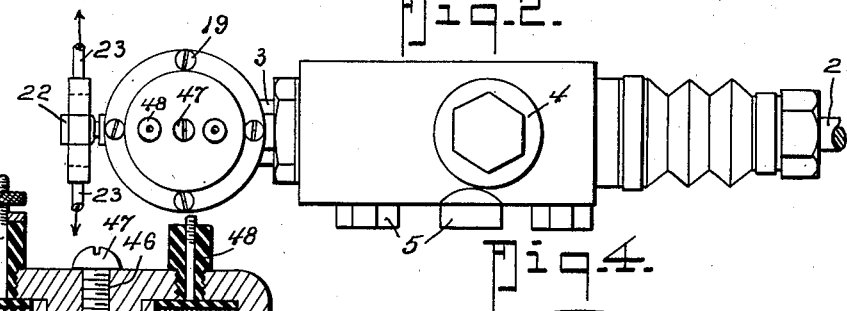
Fig. 2 is a top plan view of the same.

In the drawings in which like numerals of reference designate like parts in all the figures, 1 represents the usual brake applying cylinder and oil reservoir, 2 the brake applying rod which is operated by the usual pedal and return spring (not shown), 4 the filler cap and 5 the mounting lugs, all of which are of known construction and per se are not of my invention. In the usual construction the distributor 22 is directly connected to the outlet of the unit 1 but when my invention is used the distributor 22 is removed and an adapter 3 is screwed into the unit 1 in place of the distributor 22. The adapter 3 has a passage (see dotted lines Fig. 1) which is constantly in communication with the interior of the cylinder 6 through a coupling nipple 10 screwed into the adapter 3 and into the hole 9 in the bottom cover 8 of the lower cylinder 6 of the unit which comprises an essential part of my invention.

The lower cylinder 6 has a bottom flange 7 to which the cover 8 is fastened by screws 19, and a top flange 17 to which the flange 18 of the upper cylinder 28 is secured by screws 19. The lower cylinder has a partition web 11 beneath which projects the valve seat member 12 in whose bore 16 the piston valve 32 fits with a close sliding fit.

Figure 3:
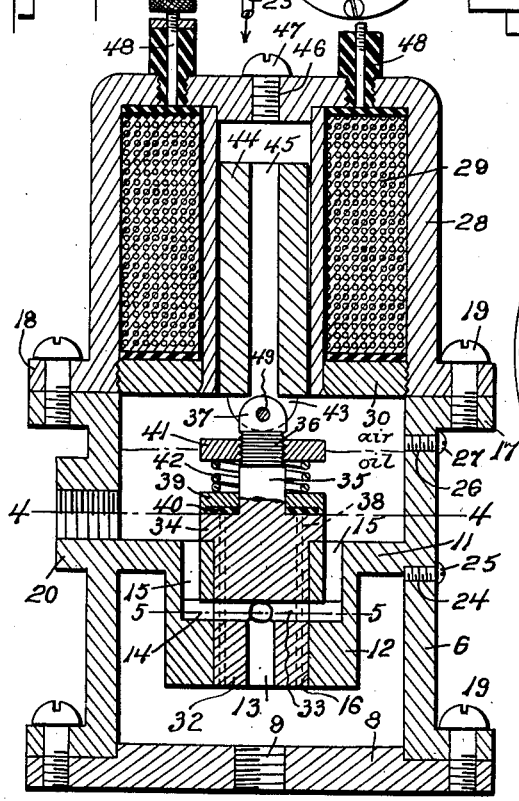
Fig. 3 is an enlarged central, vertical, longitudinal section of the attachment comprising my invention.
Figure 4:
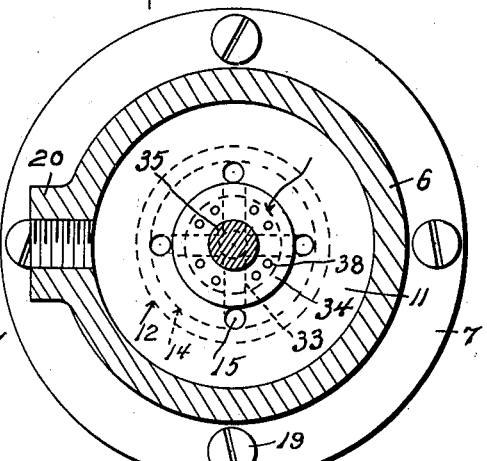
Fig. 4 is a horizontal section on the line 4—4 of Fig. 3.

The piston 32 has a vertical port 13 which registers with radial ports 33 that in turn register with an annular recess 14 in the member 12, the recess 14 registering with vertical ports 15 in the member 12 and web 11 so that when the valve 32 is seated the chamber beneath web 11 will be in free communication with the chamber above that web (see Fig. 3).

The distributor 22 is coupled at 21 to the boss 20 of cylinder 6 and communicates with the upper chamber of the cylinder. The pipes 23, to the right and left sets of brakes, connect to the distributor 22.

In order that trapped air within the cylinder 6 below the web 11 may be bled off, the cylinder has a tapped hole 24 closable by a screw plug 25. The cylinder also has an oil level overflow-hole 26 normally plugged by a screw 27 of which more will be said later.

The upper cylinder 28 is closed at its upper end by an integral wall in the center of which is a filling aperture 46 normally closed by a screw plug 47. The magnet coil 29 is located in the upper cylinder 28 (which is of magnetic material while the lower cylinder is of non-magnetic material) and is wound on but insulated from the core-guide cylinder 31 which is secured to a threaded disc 30 screwed into the lower end of cylinder 28. The ends of coil 29 are secured to the insulated terminals or binding posts 48.

The core (magnetic) 44 is hollow, having a bore 45 from end to end, and at its lower end it has ears 43 between which the ear 37 of the valve stem 35 projects and to which it is attached by a pin 49.

The valve 32 has a flange 34 to rest on web 11 when the valve is fully seated and it has a series of small bye-pass bores 38 controlled by a back-check valve 39 having a sealing disc 40 of suitable material. The valve 39 is held to its seat on the valve 32, to cover the bores 38, by pressure of gravity assisted by the spring 42 whose tension may be adjusted by a nut 41 screwed into the threaded part 36 of the stem 35.

In practice the unit 1, fitting 3, and the lower chamber of cylinder 6, are filled with oil; the upper chamber of cylinder 6 is preferably filled with oil only to the level of plugged hole 26 which is located sufficiently far above lug 20 so that the passage through said lug 20 will never become uncovered by the oil in cylinder 6.

Oil is introduced into the cylinder 6 through the opening 46 upon removal of screw 47 and passes down through 31, 45 into the upper chamber of cylinder 6, into distributor 22 and oil lines 23 and passes into the lower chamber of cylinder 6 and into fitting 3 etc. Air that may be in these parts will levitate into the upper chamber of cylinder 6 and into cylinder 28 as will be obvious.

It should be noted that by employing a piston valve attached to the core of the magnet the core 44 can be sucked in by the magnet until it contacts the top of the case and closes the air gap between the core and the top of the case, thereby permitting the use of a weaker energizing coil 29 than would be necessary if a poppet type valve were employed; with a poppet type valve in order to ensure its tight seating some clearance would have to be provided for between the top of the case 28 and the adjacent end of the core-armature 44.

The cylinder 31 is preferably made of non-magnetic material while the case 28, disc 30 and core-armature are made of magnetic material. The cylinder 6 is also made of non-magnetic material.

*Operation*

Assume the brakes to be off, the parts of the attachment will be in the position shown in Fig. 3. Now when brake rod 2 is forced in (by pressure on the brake pedal, not shown, which is connected to rod 2) the oil will flow from the lower chamber through ducts 13, 14, 15 to upper chamber and apply the brakes. The operator then closes an electric circuit (not shown) to energize coil 29, which thereupon draws up core-armature 44 and in turn raises valve 32 until ports 33 cease to register with recess 14. The circuit remaining closed, when the operator removes his foot from the brake pedal, pressure in the lower chamber of cylinder 6 will be removed while pressure in the upper chamber will remain since valve 39—40 keeps ports 38 closed against back flow of oil.

If a partial application of the brakes has been given and magnet 29 remains energized, a further pressure on the brake pedal will cause fluid to pass upwardly through bye-pass ports 38, lift valve 39—40 and flow into upper chamber to give the additional pressure required further to apply the brakes.

To release the applied brakes, with foot off the brake pedal, the operator only has to open the electric circuit again whereupon magnet 29 becomes inactive, and gravity assisted by the higher pressure in the upper chamber of cylinder 6, causes valve 32 to again become seated and ports 15—14—33—13 are again brought into communicaion, allowing return flow of oil and release of brakes.

Heretofore in all hydraulic brake systems now on the market with which I am familiar, it has been vitally necessary to see that no air shall be allowed to become trapped in the oil lines and operating cylinder, but with my invention I am enabled to provide an air cushion for the incompressible motive fluid; by virtue of this air cushion a softer application of the brakes to avoid locking can be obtained and danger of injury to passengers by sudden stops is reduced to a minimum.

*The second embodiment*

In Figs. 6 and 7, I have shown another embodiment of the invention, which though less desirable than the compact form of Figs. 1 to 5 inclusive will function satisfactorily. In this form the bye-pass ducts 38 and valve 39—40 etc. are omitted from the valve 32ª and their functions are performed by providing a back check valve 50 coupled to the adaptor 3ª (which in this case has a through passage) and joining the valve 50 to the T 52 by a pipe 51, the T 52 being connected to the distributor 22ª by a pipe 53.

In this form brake pressure is passed from adaptor 3ª through ports 13ª—33ª—15ª and recess 14ª and also via valve 50 and pipe 51 to T 52 and from thence via pipe 53 to distributor 22ª; after partial application of the brakes is accomplished and valve 32ª raised by the energizing of magnet 29ª oil flow through the cylinder 6ª is cut off; further application of the brake pedal then causes the fluid to travel to distributor 22ª via 50, 51, 52 and 53.

When pedal pressure is released, (magnet 29ª remaining energized) the brakes will be held applied as before, since back check valve 50 prevents return flow via 51 etc.

Upon de-energizing magnet 29ª the parts are returned to normal position and the brakes released.

If more cushioning effect is desired in the brakes, it is only necessary, when filling the cylinder 6 to leave screw 25ª in place. A certain amount of air will then be trapped around valve seat 12. Preferably however, the lower chamber of cylinder 6 should be completely filled with oil.

In Figs. 6 and 7 those parts which correspond to like parts in Fig. 1 to 5 bear the same reference number plus the index letter *a* so a repetition of the description of the construction and operation of those parts is believed to be superfluous.

From the foregoing description taken with the accompanying drawings it is thought the construction, operation and advantages of the invention will be clear to those skilled in the art and I desire it to be understood that changes in the details of construction to adapt the invention to different hydraulic brake systems may be made within the scope of the invention and the appended claims.

What I claim is:

1. In hydraulic brake apparatus embodying a brake applying cylinder, and an oil line from the cylinder to the brakes, of electrically controlled means connected in the oil line for holding the fluid against return flow after application of the brake applying force at the brakes and release of the brake applying force at the cylinder, said means including a valve and a casing therefor through which the brake fluid passes to the brakes, and a trapped-air spring located in the casing, against which spring the fluid pressure is in part exerted.

2. In hydraulic brake apparatus which includes a brake applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said cylinder, a normally open valved passage between said chambers, and electro-magnetic means under control of the operator for actuating the valve in said passage to close the same.

3. In hydraulic brake apparatus which includes a brake applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said cylinder, a normally open valved passage between said chambers, and electro-magnetic means under control of the operator for actuating the valve in said passage to close the same, a bye-pass to said valve and a back-check valve controlling flow of liquid through said bye-pass to one direction.

4. In hydraulic brake apparatus which includes a brake applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said cylinder, a normally open valved passage between said chambers, and electro-magnetic means under control of the operator for actuating the valve in said passage to close the same and an air-spring in said cylinder operating on the liquid above its highest level in the cylinder and above said valved passage.

5. In hydraulic brake apparatus which includes a brake applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said cylinder, a normally open valved passage between said chambers, and electro-magnetic means under control of the operator for actuating the valve in said passage to close the same, a bye-pass to said valve and a back-check valve controlling flow of liquid through said bye-pass to one direction, and an air-spring in said cylinder operating on the liquid above its highest level in the cylinder and above said valved passage.

6. In hydraulic brake apparatus which includes a brake applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said cylinder, a normally open valved passage between said chambers, and electro-magnetic means under control of the operator for actuating the valve in said passage to close the same and an air-spring in said cylinder operating on the liquid above its highest level in the cylinder and above said valved passage and an auxiliary air-spring operating on the liquid in the cylinder at the approach side of said passage.

7. In hydraulic brake apparatus which includes a brake applying cylinder connected by pipe lines to the brakes proper, operator controlled means to lock the fluid in the lines after application of the brakes, said means comprising a cylinder having a web dividing it into an upper chamber and a lower chamber, the upper chamber communicating with said pipe lines and the lower chamber communicating with said cylinder, a normally open valved passage between said chambers, and electro-magnetic means under control of the operator for actuating the valve in said passage to close the same, a bye-pass to said valve passage to close the same, a bye-pass to said valve and a back-check valve controlling flow of liquid through said bye-pass to one direction, and an air-spring in said cylinder operating on the liquid above its highest level in the cylinder and above said valved passage and an auxiliary air-spring operating on the liquid in the cylinder at the approach side of said passage.

8. An attachment for the purposes described comprising a casing divided by partitions into an upper chamber, a lower chamber and an intermediate chamber, an electro-magnet secured in the upper chamber, a liquid inlet to the lower chamber, a liquid outlet from the intermediate chamber, a valve seat member carried by the partition between the lower and intermediate chambers and having a liquid passage, a valve cooperating with said seat member and positioned normally to leave said liquid passage open, a core-armature coupled to said valve and actuated upon energization of said magnet to move said valve to close said liquid passage.

9. An attachment for the purposes described comprising a casing divided by partitions into an upper chamber, a lower chamber and an intermediate chamber, an electro-magnet secured in the upper chamber, a liquid inlet to the lower chamber, a liquid outlet from the intermediate chamber, a valve seat member carried by the partition between the lower and intermediate chambers and having a liquid passage, a valve cooperating with said seat member and positioned normally to leave said liquid passage open, a core-armature coupled to said valve and actuated upon energization of said magnet to move said valve to close said liquid passage, and a bye-pass between said lower and intermediate chambers with a back-check valve controlling the bye-pass.

10. An attachment for the purposes described comprising a casing divided by partitions into an upper chamber, a lower chamber and an intermediate chamber, an electro-magnet secured in the upper chamber, a liquid inlet to the lower chamber, a liquid outlet from the intermediate chamber, a valve seat member carried by the partition between the lower and intermediate chambers and having a liquid passage, a valve cooperating with said seat member and positioned normally to leave said liquid passage open, a core-armature coupled to said valve and actuated upon energization of said magnet to move said valve to close said liquid passage, said valve having bye-pass ports, and a bye-pass valve carried by said valve to close said bye-pass ports against fluid flow in one direction.

11. An attachment for the purposes described comprising a casing divided by partitions into an upper chamber, a lower chamber and an intermediate chamber, an electro-magnet secured in the upper chamber, a liquid inlet to the lower chamber, a liquid outlet from the intermediate chamber, a valve seat member carried by the partition between the lower and intermediate chambers and having a liquid passage, a valve cooperating with said seat member and positioned normally to leave said liquid passage open, a core-armature coupled to said valve and actuated upon energization of said magnet to move said valve to close said liquid passage, said valve having bye-pass ports and a spring-loaded bye-pass valve carried by said valve to close said bye-pass ports against return flow of liquid.

12. In apparatus of the character described, a cylinder divided by a cross partition into a lower and an upper chamber, said cross partition having a member with an opening through the same constituting a piston valve seat, said member having a recess registering with said through opening and having a set of ports communicating with said upper chamber, a piston valve having ports to effect communication between said lower chamber and said recess, and having a stem located in said upper chamber, an electro-magnet having a housing constituting a top closure for said upper chamber and containing a solenoidal-magnet having a hollow core-guide, a core operable in said guide and connected to said valve stem, means to admit liquid into said lower chamber and means to pass liquid from said upper chamber.

13. In apparatus of the character described, a cylinder divided by a cross partition into a lower and an upper chamber, said cross partition having a member with an opening through the same constituting a piston valve seat, said member having a recess registering with said through opening and having a set of ports communicating with said upper chamber, a piston valve having ports to effect communication between said lower chamber and said recess, and having a stem located in said upper chamber, an electro-magnet having a housing constituting a top closure for said upper chamber and containing a solenoidal-magnet having a hollow core-guide, a core operable in said guide and connected to said valve stem, means to admit liquid into said lower chamber and means to pass liquid from said upper chamber, and means to trap air in said upper chamber above the level of the liquid outlet from said upper chamber.

14. In apparatus of the character described, a cylinder divided by a cross partition into a lower and an upper chamber, said cross partition having a member with an opening through the same constituting a piston valve seat, said member having a recess registering with said through opening and having a set of ports communicating with said upper chamber, a piston valve having ports to effect communication between said lower chamber and said recess, and having a stem located in said upper chamber, an electro-magnet having a housing constituting a top closure for said upper chamber and containing a solenoidal-magnet having a hollow core-guide, a core operable in said guide and connected to said valve stem, means to admit liquid into said lower chamber and means to pass liquid from said upper chamber, said core and said valve being free to swivel on the axis of the valve as well as to move along the axis.

15. In apparatus of the character described, a cylinder divided by a cross partition into a lower and an upper chamber, said cross partition having a member with an opening through the same constituting a piston valve seat, said member having a recess registering with said through opening and having a set of ports communicating with said upper chamber, said piston valve having ports to effect communication between said lower chamber and said recess, and having a stem located in said upper chamber, an electro-magnet having a housing constituting a top closure for said upper chamber and containing a solenoidal-magnet having a hollow core-guide a core operable in said guide and connected to said valve stem, means to admit liquid into said lower chamber and means to pass liquid from said upper chamber, and means to trap air in said upper chamber above the level of the liquid outlet from said upper chamber, said core and said valve being free to swivel on the axis of the valve as well as to move along the axis.

16. In apparatus of the character described, a cylinder divided by a cross partition into a lower and an upper chamber, said cross partition having a member with an opening through the same constituting a piston valve seat, said member having a recess registering with said through opening and having a set of ports communicating with said upper chamber, a piston valve having ports to effect communication between said lower chamber and said recess, and having a stem located in said upper chamber, an electro-magnet having a housing constituting a top closure for said upper chamber and containing a solenoidal-magnet having a hollow core-guide, a core operable in said guide and connected to said valve stem, means to admit liquid into said lower chamber and means to pass liquid from said upper chamber, said valve having bye-pass ports from the lower to the upper chamber of the cylinder, and a spring loaded back-check valve on said stem to close said bye-pass ports.

17. In apparatus of the character described, a cylinder divided by a cross partition into a lower and an upper chamber, said cross partition having a member with an opening through the same constituting a piston valve seat, said member having a recess registering with said through opening and having a set of ports to effect communication between said lower chamber and said recess, and having a stem located in said upper chamber, an electro-magnet having a housing constituting a top closure for said upper chamber and containing a solenoidal-magnet having a hollow core guide, a core operable in said guide and connected to said valve stem, means to admit liquid into said lower chamber and means to pass liquid from said upper chamber, and means to trap air in said upper chamber above the level of the liquid outlet from said upper chamber, said valve having bye-pass ports from the lower to the upper chamber of the cylinder, and a spring loaded back-check valve on said stem to close said bye-pass ports.

18. In an hydraulic brake system the combination with a brake applying cylinder and the liquid pipe-line from the cylinder to brakes proper, of electrically controlled means operating after application of the brakes to hold the liquid line against return movement when the brake cylinder action is released, while permitting further brake applying action if desired, said means including a valve and a casing therefor through which the brake fluid passes to the brakes, and a trapped-air spring located in the casing, against which spring the fluid pressure is in part exerted.

19. In an hydraulic brake system the combination with a brake applying cylinder and the liquid pipe-line from the cylinder to brakes proper, of electrically controlled means operating after application of the brakes to hold the liquid line against return movement when the brake cylinder action is released, said means including a valve and a casing therefor through which the brake fluid passes to the brakes, and a trapped-air spring located in the casing, against which spring the fluid pressure is in part exerted.

20. An attachment for the purposes described comprising a casing divided by partitions into an upper chamber, a lower chamber and an intermediate chamber, an electro-magnet secured in the upper chamber, a liquid inlet to the lower chamber, a liquid outlet from the intermediate chamber, a valve seat member carried by the partition between the lower and intermediate chambers and having a liquid passage, a valve cooperating with said seat member and positioned normally to leave said liquid passage open, a core-armature coupled to said valve and actuated upon energization of said magnet to move said valve to close said liquid passage, and an air spring within said casing against which the liquid acts.

21. An attachment for the purposes described comprising a casing divided by partitions into an upper chamber, a lower chamber and an intermediate chamber, an electro-magnet secured in the upper chamber, a liquid inlet to the lower chamber, a liquid outlet from the intermediate chamber, a valve seat member carried by the partition between the lower and intermediate chambers and having a liquid passage, a valve cooperating with said seat member and positioned normally to leave said liquid passage open, a core-armature coupled to said valve and actuated upon energization of said magnet to move said valve to close said liquid passage and a bye-pass between said lower and intermediate chambers with a back-check valve controlling the bye-pass, and an air spring within said casing against which the liquid acts.

22. In brake holding apparatus in combination with a brake applying system, a back check device cooperatively connected with said system and including means to hold the brakes set, said means including a solenoidal magnet which comprises a case of magnetic material, an energizing coil in the case, and a core of magnetizable material, said core and said case being constructed so that said core may be fully drawn in and seated in contact with the case by magnetic force so as to close the magnetic circuit before back pressure occurs in the brake holding means to resist the movement of said core, and operator actuated means to effect the energizing and de-energizing of said coil at will.

23. In brake holding apparatus, in combination with an hydraulic brake system which includes a brake applying cylinder and a distributor with branch-line connections to the several wheel brakes and a main duct from the brake applying cylinder to the distributor, a device interposed in the system at a place between the brake applying cylinder and the distributor, said device comprising a casing having a valved passage and divided into an upper and a lower chamber, the lower chamber being in communication with said brake cylinder and the upper chamber being in communication with the distributor, a solenoidal magnet enclosed in a magnetic case carried by said casing, said magnet having a core-receiving recess communicating with said upper chamber, a core in said recess and connected with the valve in said valved passage to actuate the same, the movement of said core and valve being such that the free end of said core may contact the magnetic case to close the gap in the magnetic circuit before back pressure occurs in the upper chamber which tends to resist movement of said core under the influence of said coil when energized.

24. In brake holding apparatus, in combination with an hydraulic brake system which includes a brake applying cylinder and a distributor with branch-line connections to the several wheel brakes and a main duct from the brake applying cylinder to the distributor, a device interposed in the system at a place between the brake applying cylinder and the distributor, said device comprising a casing having a valved passage and divided into an upper and a lower chamber, the lower chamber being in communication with said brake cylinder and the upper chamber being in communication with the distributor, a solenoidal magnet enclosed in a magnetic case carried by said casing, said magnet having a core-receiving recess communicating with said upper chamber, a core in said recess and connected with the valve in said valved passage to actuate the same, the movement of said core and valve being such that the free end of said core may contact the magnetic case to close the gap in the magnetic circuit before back pressure occurs in the upper chamber which tends to resist movement of said core under the influence of said coil when energized, and a gaseous fluid trapped in said core-receiving recess acting as an air spring on the liquid in said upper chamber.

FRANK L. DARLING.